(No Model.)
W. H. KILBOURN.
AUTOMATIC HORSE CHECK.
No. 395,333. Patented Jan. 1, 1889.
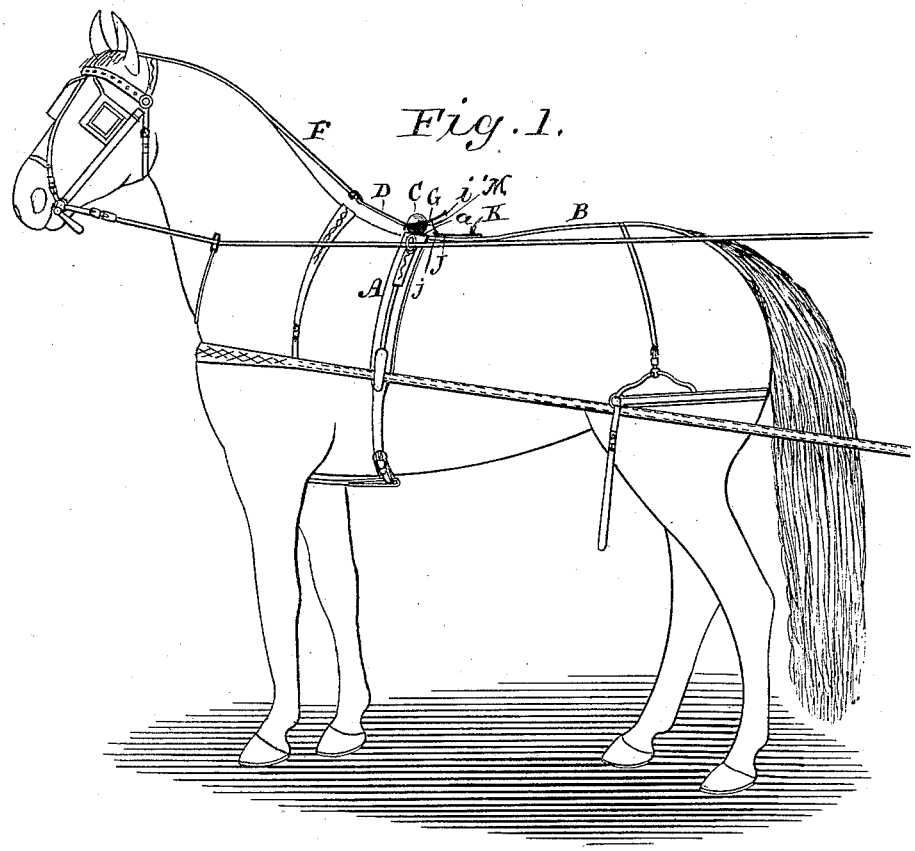
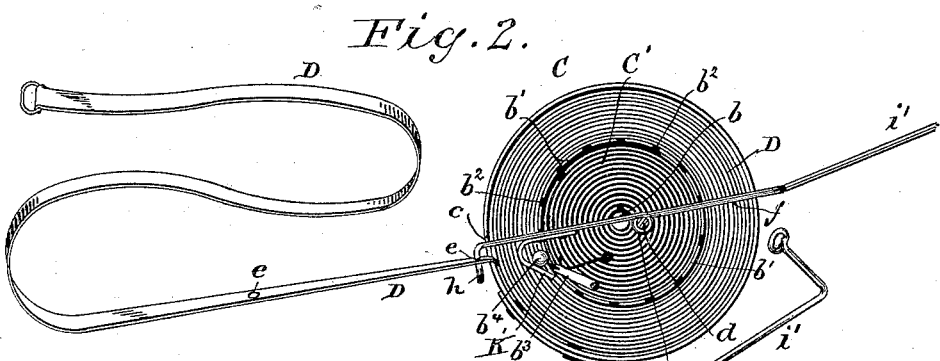
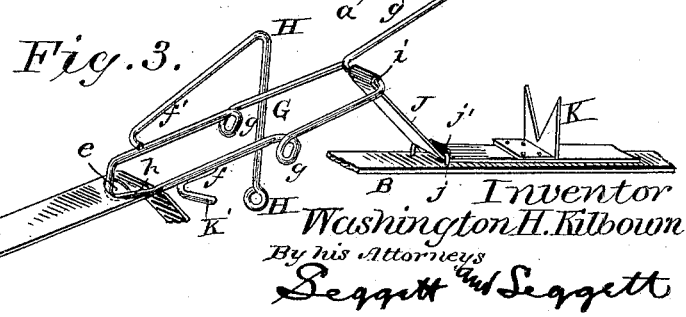
Witnesses
Al. C. Newman
G. F. Downing
Inventor
Washington H. Kilbourn
By his Attorneys
Leggett and Leggett

UNITED STATES PATENT OFFICE.

WASHINGTON H. KILBOURN, OF OLEAN, NEW YORK.

AUTOMATIC HORSE-CHECK.

SPECIFICATION forming part of Letters Patent No. 395,333, dated January 1, 1889.

Application filed January 12, 1888. Renewed November 23, 1888. Serial No. 291,725. (No model.)

*To all whom it may concern:*

Be it known that I, WASHINGTON H. KILBOURN, of Olean, in the county of Cattaraugus and State of New York, have invented a certain new and useful Improvement in Harness Attachments; and I do hereby declare the following to be a full, clear, and exact description of the invention, such as will enable others skilled in the art to which it appertains to make and use the same.

My invention relates to an improved harness attachment, and particularly to devices for controlling the operation of the checkrein.

The object of my present invention is to produce a device which shall operate automatically to control the raising of the checkrein of a harness.

A further object is to so construct the device that it will secure the checkrein when in its normal elevated position, and which may be operated by a driver to release said checkrein without the necessity of alighting from the vehicle.

A further object is to so construct and arrange the several parts of the device that when the horse raises his head the checkrein can be elevated to its normal position and locked.

A further object is to provide a device for controlling the operation of a checkrein which will be simple and substantial in construction, ornamental in appearance, and cheap to manufacture.

With these objects in view my invention consists in the peculiar construction and novel combination and arrangement of parts, as will be hereinafter set forth, and pointed out in the claims.

In the accompanying drawings, Figure 1 is a view of a horse having my improved device applied thereto, the parts being shown in their normal positions. Fig. 2 is a side elevation of the device with a side of the box removed, showing the positions of the parts when the checkrein is lowered. Fig. 3 is a detached view of the operating-lever.

A indicates a saddle of any preferred construction, and B a back-strap attached thereto in the usual manner. A plate, $a$, is fixed at one end to the saddle by means of rivets or otherwise, and supports at its opposite extremity a box, C, preferably of circular form. An arbor or shaft, $b$, is journaled within the box C, advisably at or near its center, and made to extend from side to side of the box and serve as an arbor for a coiled spring, C′, which is secured at one end to said shaft, as shown, and at the other end to a drum, $b'$, mounted upon the shaft $b$. The periphery of the drum $b'$ is preferably furnished with notches $b^2$ for the reception of a spring-sustained dog or pawl, $b^3$, which is adapted to ride over said notches when the drum is rotated in one direction, but enter them and prevent the drum from turning in the reverse direction. This dog or pawl is operated through the medium of a button, $b^4$, in a manner which will be hereinafter explained.

A metallic tape, D, is secured at one end to the drum $b'$, and has its free extremity extended forwardly and passed through an opening, $c$, in the box C, said free end of the tape being furnished with a ring somewhat larger than the opening in the box, to which the checkrein F is attached. If preferred, a strap may be attached to this ring and a hook secured at its free end for the reception of the checkrein. The tape D is further provided near its free end with a perforation, $e$, for a purpose which will be presently explained.

Fixed to the flat side faces of the box C, preferably near their center, are short pins or projections $d$, which serve as a fulcrum for a lever, G. This lever is preferably made of one piece of stout wire bent in the form shown in Fig. 3. As seen in said figure, the lever G comprises two parallel arms, $f f'$, coiled at points midway between their ends to form eyes or loops $g$, which encircle the pins $d$ on the box, and thus produce a bearing for the lever upon said pins. The connecting-bar $h$, at the forward end, is bent downwardly at its center and permitted to enter the perforation $e$ of the metallic tape D; or, if preferred, this V-shaped portion may be caused to enter the ring secured to the end of the tape to prevent the latter from being unwound at an improper time. The rear connecting-bar, $i$, is extended beyond the arm $f'$ and bent to extend first rearwardly some distance and then outwardly at right angles and produce an arm, $i'$. The V-shaped bar $h$ is held normally in the perforation $e$ by means of a spring, H, secured at one end to one face of the box and bearing at its free end upon an arm of the lever G.

Attached to the rear cross-bar, $i$, of the lever G is a strap or wire, J, which passes downwardly from its attachment with the lever and through an eye or loop, $j$, secured to the back-strap B, and preferably furnished with a roller, $j'$, said strap or wire being free to have a sliding movement through the eye of loop $j$. The strap J is provided in rear of the eye or loop $j$ with a V-shaped crotch or fork, K, of wire or other suitable material, care being taken that the material of which it is made and its attachment to the strap be of sufficient rigidity to maintain the crotch in an upright position.

When the checkrein is in its normal raised position, as shown in Fig. 1, and it is desired to release it to allow the horse to lower his head, as in the act of eating or drinking, the reins may be thrown over the arm $i'$, thus causing the lever G to be turned on its fulcrum and the V-shaped bar $h$ to be withdrawn from the perforation $e$ and the tape D allowed to unwind. When the horse again raises his head, the rein will be again thrown over arm $i'$ and cause a bent arm, K', fixed to the arm $f$ of the lever G, to strike the button $b^4$, and thus free the spring C' and permit the tape to be wound upon the drum $b'$. When the tape is wound upon the drum within the box, the spring H will cause the bar $h$ to enter the perforations $e$, and thus the checkrein attached to the tape will be secured in position. This operation of the checkrein may also be performed through the medium of the strap J and crotch K. By inserting the knotted end of a whip in the crotch K and pulling it rearwardly, the lever is caused to turn and operate the device, as above described. It is preferable that a stop, M, be secured to one face of the box to limit the downward movement of the lever G.

It is evident that slight changes may be made in the constructive details of my invention without departing from the spirit thereof; hence I do not wish to limit myself to the precise details of construction herein described; but, Having fully described my invention, what I claim as new, and desire to secure by Letters Patent, is—

1. In a harness, the combination, with a box, a spring-actuated tape therein, and a spring-actuated dog within the box for locking the tape, of a lever fulcrumed on the box, said lever provided with a hook in position to release the dog when operated, substantially as set forth.

2. In a harness, the combination, with a box, a spring-actuated tape having perforations therein, and a spring-actuated dog pivoted in the box for locking the tape, of a lever fulcrumed on the box, said lever having a hook in position to release the dog, an arm on one end of the lever, and a V-shaped crotch loosely connected with one end of the said lever, substantially as set forth.

3. In a harness, the combination, with a checkrein, of a box secured to the harness, a spring-actuated tape provided with a perforation mounted on a drum journaled in the box, a lever fulcrumed on the box, a V-shaped bar at one end of said lever adapted to enter the perforation in the tape, and a strap attached to the free end of the lever, by which to operate said lever to release the tape and checkrein, substantially as set forth.

4. In a harness, the combination, with a checkrein, of a box secured to the harness, a spring-actuated tape mounted on a drum journaled in the box, said tape being provided with a perforation near one end and having its free end attached to a checkrein, a lever fulcrumed on the box, a bar of said lever adapted to enter the perforation of the tape, a strap attached to the free end of the lever, a loop on the harness, through which the strap is adapted to pass, and a V-shaped crotch at the free end of said strap, substantially as set forth.

5. In a harness, the combination, with a checkrein, of a box secured to the harness, a spring-actuated tape mounted in the box, a V-shaped bar made integral with the lever to enter a perforation in the tape, a rearwardly-projecting arm, also integral with the lever, a spring for maintaining the bar in engagement with the tape, and an arm secured to the lever to release the actuating mechanism, substantially as set forth.

In testimony whereof I have signed this specification in the presence of two subscribing witnesses.

WASHINGTON H. KILBOURN.

Witnesses:
ERNEST F. KRUSE,
F. W. KRUSE.